(12) United States Patent
Meyer

(10) Patent No.: US 11,154,080 B2
(45) Date of Patent: Oct. 26, 2021

(54) HIGH PRESSURE FROZEN STERILIZATION PROCESS

(75) Inventor: Richard S. Meyer, Federal Way, WA (US)

(73) Assignee: JCR Technologies LLC, Harrison, ID (US)

( * ) Notice: Subject to any disclaimer, the term of this patent is extended or adjusted under 35 U.S.C. 154(b) by 701 days.

(21) Appl. No.: 12/664,577

(22) PCT Filed: Jun. 25, 2008

(86) PCT No.: PCT/US2008/068190
§ 371 (c)(1),
(2), (4) Date: Nov. 19, 2010

(87) PCT Pub. No.: WO2009/003040
PCT Pub. Date: Dec. 31, 2008

(65) Prior Publication Data
US 2011/0059217 A1    Mar. 10, 2011

Related U.S. Application Data

(60) Provisional application No. 60/946,670, filed on Jun. 27, 2007, provisional application No. 61/020,949, filed on Jan. 14, 2008.

(51) Int. Cl.
*A23L 3/015* (2006.01)
*A23L 3/3508* (2006.01)
*A23L 3/37* (2006.01)

(52) U.S. Cl.
CPC .......... *A23L 3/0155* (2013.01); *A23L 3/3508* (2013.01); *A23L 3/37* (2013.01)

(58) Field of Classification Search
CPC ............. A23L 3/015; A23L 3/36; F25D 25/00
USPC ................ 426/521, 524, 385, 393, 327, 335
See application file for complete search history.

(56) References Cited

U.S. PATENT DOCUMENTS

| | | | |
|---|---|---|---|
| 2,912,330 A | 11/1959 | Hawk et al. | 99/1 |
| 3,097,099 A | 7/1963 | Beckmann | 99/195 |
| 3,604,123 A | 7/1971 | King | 34/9 |
| 3,692,532 A * | 9/1972 | Shenkenberg | 426/584 |
| 3,758,257 A | 9/1973 | Dastur | 426/331 |
| 3,831,389 A | 8/1974 | Lipona | 62/63 |
| 3,968,265 A | 7/1976 | Shatila et al. | 426/550 |
| 4,746,524 A | 5/1988 | Meyer | 426/330 |
| 5,213,029 A | 5/1993 | Yutaka | 99/474 |
| 5,232,726 A | 8/1993 | Clark et al. | 426/519 |
| 5,316,745 A | 5/1994 | Ting et al. | 422/295 |
| 5,393,544 A | 2/1995 | Hannah et al. | 426/250 |
| 5,439,703 A | 8/1995 | Kanda et al. | 426/665 |
| 5,593,714 A * | 1/1997 | Hirsch | 426/268 |
| 5,658,610 A | 8/1997 | Bergman et al. | 426/665 |
| 6,007,864 A | 12/1999 | Goodband et al. | 426/643 |
| 6,017,572 A | 1/2000 | Meyer | 426/521 |
| 6,027,751 A * | 2/2000 | Romick et al. | 426/61 |
| 6,033,701 A | 3/2000 | Hirsch | 426/268 |
| 6,086,936 A | 7/2000 | Wilson et al. | 426/521 |
| 6,110,516 A | 8/2000 | Hoover et al. | 426/321 |
| 6,132,787 A * | 10/2000 | Bunger et al. | 426/330.3 |
| 6,177,115 B1 | 1/2001 | Meyer | 426/521 |
| 6,207,215 B1 | 3/2001 | Wilson et al. | 426/521 |
| 6,270,723 B1 | 8/2001 | Lagharn, Jr. et al. | 422/39 |
| 6,426,103 B2 | 7/2002 | Voisin | 426/113 |
| 6,440,484 B1 | 8/2002 | Tanaka et al. | 426/643 |
| 6,537,601 B1 | 3/2003 | Voisin | 426/113 |
| 6,652,896 B2 * | 11/2003 | Young et al. | 426/330.2 |
| 6,696,019 B2 | 2/2004 | Lagharn, Jr. et al. | 422/39 |
| 7,220,381 B2 | 5/2007 | Ting et al. | 422/1 |
| 2002/0182107 A1 | 12/2002 | Lagharn, Jr. et al. | 422/39 |
| 2003/0161917 A1 | 8/2003 | Voisin | 426/410 |
| 2004/0043110 A1 * | 3/2004 | Liberman | A23B 4/06 426/35 |
| 2004/0126480 A1 | 7/2004 | Lelieveld et al. | 426/665 |

(Continued)

FOREIGN PATENT DOCUMENTS

| EP | 0 429 966 A2 | 6/1991 |
|---|---|---|
| EP | 0 550 787 A1 | 7/1993 |

(Continued)

OTHER PUBLICATIONS

Freezing of Fruits and Vegetables NPL, Apr. 27, 2007, http://www.fao.org/docrep/008/y5979e/y5979e03.htm.*
Food safety fact sheet NPL, Apr. 2003, http://www.idph.state.il.us/about/fdd/fdd_fs_foodservice.htm.*
Canning tomato products NPL, 2006.*
Alemán et al., "Comparison of Static and Step-Pulsed Ultra-High Pressure on the Microbial Stability of Fresh Cut Pineapple," *J Sci Food Agric* 76:383-388, 1998.
Alemán et al., "Pulsed Ultra High Pressure Treatments for Pasteurization of Pineapple Juice," *Journal of Food Science* 61(2):388-390, 1996.

(Continued)

*Primary Examiner* — Erik Kashnikow
*Assistant Examiner* — Preston Smith
(74) *Attorney, Agent, or Firm* — Seed IP Law Group LLP

(57) ABSTRACT

Methods of sterilizing a temperature sensitive material, such as an acidified or non-acidified food product, pharmaceutical product or cosmetic product, are disclosed. The methods comprise freezing the temperature sensitive material to an initial temperature of less than or equal to −2° C. and then either (i) pressurizing the frozen temperature sensitive material to a first elevated pressure of at least 250 MPa for a predetermined first period of time of at least 3 minutes or (ii) pressurizing the frozen temperature sensitive material to a first elevated pressure of at least 250 MPa for a predetermined first period of time of at least 90 seconds, releasing the first elevated pressure for a predetermined pause period of time and then pressurizing the temperature sensitive material to a second elevated pressure of at least 250 MPa for a predetermined second period of time of at least 90 seconds.

20 Claims, No Drawings

(56) References Cited

U.S. PATENT DOCUMENTS

| | | | |
|---|---|---|---|
| 2004/0151620 A1 | 8/2004 | Laugharn, Jr. et al. | 422/39 |
| 2004/0191382 A1* | 9/2004 | Cooper et al. | 426/521 |
| 2005/0142259 A1 | 6/2005 | Meyer | 426/335 |
| 2006/0034980 A1* | 2/2006 | Perdue | 426/234 |
| 2007/0085059 A1* | 4/2007 | Mora-Gutierrez et al. | |
| | | | 252/400.21 |

FOREIGN PATENT DOCUMENTS

| | | |
|---|---|---|
| EP | 1 295 537 A2 | 3/2003 |
| FR | 2 750 011 A1 | 12/1997 |
| IN | 182400 A | 4/1999 |
| JP | 63-169947 A | 7/1988 |
| JP | 02-257865 A | 10/1990 |
| JP | 03-290174 A | 12/1991 |
| JP | 04-356156 A | 12/1992 |
| JP | 05-007479 A | 1/1993 |
| JP | 05-076328 A | 3/1993 |
| JP | 06-319490 A | 11/1994 |
| JP | 11-28078 A | 2/1999 |
| JP | 11-253136 A | 9/1999 |
| JP | 2000-157157 A | 6/2000 |
| WO | WO 95/08275 A1 | 3/1995 |
| WO | WO 95/11600 A1 | 5/1995 |
| WO | WO 97/21361 A1 | 6/1997 |
| WO | WO 99/29187 A1 | 6/1999 |
| WO | WO 99/66949 A2 | 12/1999 |
| WO | WO 00/15053 | 3/2000 |
| WO | WO 2009/003040 A1 | 12/2008 |

OTHER PUBLICATIONS

Bihari et al., "Fed Batch Cultivation of *Bacillus thuringiensis* var. *Kurstaki*," *J. Microb. Biotechnol.* 6(2):92-99, 1991.
Carpi et al., "Prove di stabilizzazione di prodotti alimentari mediante l'impiego delle alte pressioni," CNR-RAISA Flair-Flow Europe (sottoprogetto 4), Parma, Italy, May 5, 1995 (+ English translation: "Tests of stabilization of alimentary products by means of employment of high Pressure") (20 pages total).
Choi et al., "Effect of High Pressure Shift Freezing Process on Microbial Inactivation in Daily Model Food System," *International Journal of Food Engineering* 4(Iss. 5, Art. 3), 9 pages, 2008.
Dall'Aglio G., "Le Alte Pressioni Nei Prodotti Alimentari," *Stazione Sperimentale per l'industria delle Conserve* pp. 23-26, as early as 1994.
*A Complete Course in Canning and Related Processes. Book II, Microbiology, Packaging, HACCP & Ingredients*, 13th Edition (revised and enlarged by Donald L. Downing. Ph.D.), CTI Publications, Inc., Baltimore, MD, 1996.
Drake et al., "High Pressure Treatment of Milk and Effects on Microbiological and Sensory Quality of Cheddar Cheese," *Journal of Food Science* 62(4):843-845, 860, 1997.
Flow International Corporation, "Ultrahigh-Pressure Isolator for In-Line Food Processing," Information Sheet, 1997.
Fornari et al., "*Inactivation of* Bacillus *Endospores by High Pressure Treatment,*" *Industrial Conserve* 70(3):259-265, 1995.
Gould, G. W., "Inactivation of Spores in Food by Combined Heat and Hydrostatic Pressure," *Acta Alimentaria* 2(4):377-388, 1973.
Hayakawa et al., "Oscillatory Compared with Continuous High Pressure Sterilization on *Bacillus stearothermophilus* Spores," *Journal of Food Science* 59(1):164-167, 1994.
Hayakawa et al., "Application of High Pressure for Spore Inactivation and Protein Denaturation," *Journal of Food Science* 59(1):159-163, 1994.
Karel et al., *Principles of Food Science. Part II, Physical Principles of Food Preservation*, (Owen R. Fennema, ed.), Marcel Dekker, Inc., New York, 1975, pp. 37-53.
Luscher et al., "Effect of High-Pressure Induced ICE I-to-ICE III Phase Transitions on Inactivation of Listeria Innocuo in Frozen Suspension," Applied and Environmental Microbiology 70(7):4021-4029, Jul. 2004.
Mallidis et al., "Effect of simultaneous application of heat and pressure on the survival of bacterial spores," *Journal of Applied Bacteriology* 71:285-288, 1991.
Mertens, B. A., "Under Pressure," *Food Manufacture*, pp. 23-24, Nov. 1992.
Meyer et al., "High-Pressure Sterilization of Foods," *Food Technology* 54(11):67-71, Nov. 2000.
Morris, C. E., "High-Pressure Builds Up," *Food Engineering*, pp. 113-120, Oct. 1993.
Nakayama et al., "Comparison of Pressure Resistances of Spores of Six *Bacillus* Strains with Their Heat Resistances," *Applied and Environmental Microbiology* 62(10):3897-3900, Oct. 1996.
Oakley, R., "New Horizons in food & beverage Preservation: Alternate technologies to heat treatment to achieve food sterilisation and pasteurisation are discussed from a microbiological standpoint by Rachel Oakley of CCFRA," *Food Review* 24(3):18, 21-23, Mar. 1997.
Okazaki et al., "Possibility of the combination treatment of pressurization and heating for the purpose of food sterilization," Abstract No. E7, The Sixth Symposium by Japanese Research Group of High Pressure Bioscience, Aug. 19-20, 1993 (1 page).
Pothakamury et al., "The Pressure Builds for Better Food Processing," *Chemical Engineering Progress* 91(3):45-53, Mar. 1995.
Rovere et al., "Stabilization of Apricot Puree by Means of High Pressure Treatments," *Prehrambeno-technol.biotechnol. Rev.* 32(4):145-150, 1994.
Rovere, P., "The Third Dimension of Food Technology," *Tecnologie Alimentari* 4:1-9, 1995.
Seyderhelm et al., "Reduction of Bacillus stearothermophilus Spores by Combined High Pressure and Temperature Treatments," *European Food Science* 43(4):17-20, 1992.
Sojka et al., "Effects of Rapid Pressure Changes of the Inactivation of Bacillus subtilis spores," *Pharm. Ind.* 59(5):436-438, 1997.
Torres et al., "Pressure Pulsing: Improving UHP Effectiveness," OSU Food Process Engineering and Flow International Corporation R&D, Date prior to Oct. 19, 1998, 11 pages.
Träff et al., "High pressure equipment for food processing," in *High Pressure and Biotechnology* (C. Bainy et al., eds.) vol. 224, Colloque INSERM/John Libbey Eurotext Ltd., 1992, pp. 509-514.
Watanabe et al., "A New Method for Producing a Non-heated Jam Sample: The Use of Freeze Concentration and High-pressure Sterilization," *Agric. Biol. Chem.* 55(8):2175-2176, 1991.
Worthington et al., "Nutraceuticals: Developing a Strategy," Food Product Design, 9 pages, Apr. 1, 2000.
International Search Report and Written Opinion for PCT/US2008/068190, dated Oct. 16, 2008, 14 pages.
International Preliminary Report on Patentability for PCT/US2008/068190, dated Jan. 5, 2010, 6 pages.

* cited by examiner

HIGH PRESSURE FROZEN STERILIZATION PROCESS

CROSS-REFERENCE TO RELATED APPLICATIONS

This application claims the benefit under 35 U.S.C. § 119(e) of U.S. Provisional Patent Application No. 60/946,670 filed Jun. 27, 2007 and U.S. Provisional Patent Application No. 61/020,949 filed Jan. 14, 2008. The foregoing applications are incorporated herein by reference in their entireties.

BACKGROUND OF THE INVENTION

Field of the Invention

The present invention relates to methods of sterilizing temperature sensitive materials, such as acidified or non-acidified food products, pharmaceutical products and cosmetic products, comprising freezing the temperature sensitive materials and subjecting the frozen temperature sensitive materials to high pressure.

Description of the Related Art

A large variety of food products are formulated at a pH of 4.6 or above. For example, the pH of products such as non-dairy based products like vegetables, main meal entrees, soups, pastas, rice, chowders, meats, and chocolate beverages typically ranges from 6.2 to 6.8. Examples of such food products include main meal entrees (e.g., macaroni and cheese and chicken dinners), soups (e.g., vegetable and chicken noodle soups), beverages (e.g., chocolate milk and mocha Frappuccino®), creamy salad dressings (e.g., blue cheese and ranch), dips (e.g., ranch and French onion), vegetables (e.g., potatoes, carrots, green beans, and peas), chowders (e.g., clam chowder and ham chowder), side dishes (e.g., rice bowls, sauces, and noodles), sauces, pizzas, frozen foods (e.g., ice cream), meats (e.g., beef (hamburger, roasts, steaks), pork, poultry, seafood (especially sushi seafood) and shellfish).

These products normally require refrigeration, freezing, or retorting to preserve shelf stability. Typically, these products are pasteurized prior to freezing (except meats) to reduce vegetable cells. To pasteurize a product (regardless of whether the pH is above 4.6 or below 4.6), the product is subjected to heat above 60° C. which, unfortunately, imparts cooked flavors and softens texture. This is most noticeable in fruit products which take on a cooked flavor rather than a "freshly" picked flavor and dairy products which have a detectable cooked flavor. Products having a pH below 4.6 can be rendered shelf stable without refrigeration, freezing, or retorting by using a gentle hot-fill process (e.g., 190° F. for 4 minutes) or high pressure sterilization process (e.g., 250 MPa, at greater than 60° C.). However, both retorting (6 minutes at 250° F.) and freezing (days to months at minus 20° F.) results in an 80 to 93% loss in texture in vegetables compared to fresh, while hot filling or high pressure processing results in a loss of about 30%. While adding acidulants may prolong the shelf life of a product, typical acidulants contribute an undesirable acid taste to the products.

Accordingly, although there have been advances in the field, there remains a need in the art for improved sterilization processes for food products. The present invention addresses these needs and provides further related advantages.

BRIEF SUMMARY OF THE INVENTION

In brief, the present invention is directed to methods of sterilizing temperature sensitive materials, such as acidified or non-acidified food products, pharmaceutical products and cosmetic products, comprising freezing the temperature sensitive materials and subjecting the frozen temperature sensitive materials to high pressure.

With respect to food products, the disclosed methods produce microbiologically shelf-stable products and, when used with the disclosed acidulants, the shelf-stable products have no significant acid bite. Both acidic food products (pH below 4.6 naturally, e.g., fruits) and low acid food products can be sterilized using the disclosed methods. The disclosed methods eliminate all vegetative microbiological cells, inactivate parasites such as trichinea (trichinosis), worms, and protozoan, and prevent mold growth and yeast growth.

In one embodiment, a method for sterilizing a temperature sensitive material is provided comprising: (a) freezing the temperature sensitive material to an initial temperature of less than or equal to −2° C.; and (b) pressurizing the frozen temperature sensitive material to a first elevated pressure of at least 250 MPa for a predetermined first period of time of at least 3 minutes.

In another embodiment, a method for sterilizing a temperature sensitive material is provided comprising: (a) freezing the temperature sensitive material to an initial temperature of less than or equal to −2° C.; (b) pressurizing the frozen temperature sensitive material to a first elevated pressure of at least 250 MPa for a predetermined first period of time of at least 90 seconds; (c) releasing the first elevated pressure for a predetermined pause period of time; and (d) pressurizing the temperature sensitive material to a second elevated pressure of at least 250 MPa for a predetermined second period of time of at least 90 seconds.

These and other aspects of the invention will be evident upon reference to the following detailed description.

DETAILED DESCRIPTION OF THE INVENTION

In the following description, certain specific details are set forth in order to provide a thorough understanding of various embodiments of the invention. However, one skilled in the art will understand that the invention may be practiced without these details.

Unless the context requires otherwise, throughout the specification and claims which follow, the word "comprise" and variations thereof, such as, "comprises" and "comprising" are to be construed in an open, inclusive sense, that is as "including, but not limited to".

Reference throughout this specification to "one embodiment" or "an embodiment" means that a particular feature or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features or characteristics may be combined in any suitable manner in one or more embodiments.

As noted above, the present invention is directed to methods of sterilizing temperature sensitive materials, such as acidified or non-acidified food products, pharmaceutical products and cosmetic products, comprising freezing the temperature sensitive materials and subjecting the frozen temperature sensitive materials to high pressure.

In one embodiment, a method for sterilizing a temperature sensitive material is provided comprising: (a) freezing the temperature sensitive material to an initial temperature of less than or equal to −2° C. (to enable the formation of ice crystals within the temperature sensitive material); and (b) pressurizing the frozen temperature sensitive material to a first elevated pressure of at least 250 MPa for a predetermined first period of time of at least 3 minutes.

In more specific embodiments, the initial temperature is from −40° C. to −20° C. (e.g., from −30° C. to −40° C.), the first elevated pressure is from 250 MPa to 350 MPa (e.g., from 325 MPa to 350 MPa) and the predetermined first period of time is from 3 minutes to 10 minutes (e.g., from 3 minutes to 6 minutes). It has been found that only a single pulse of pressure of at least 250 MPa for at least 3 minutes is necessary in order to sterilize a frozen temperature sensitive material, accordingly, in a preferred embodiment of the foregoing, the method comprises such a single pressurization step.

In another embodiment, a method for sterilizing a temperature sensitive material is provided comprising: (a) freezing the temperature sensitive material to an initial temperature of less than or equal to −2° C. (to enable the formation of ice crystals within the temperature sensitive material); (b) pressurizing the frozen temperature sensitive material to a first elevated pressure of at least 250 MPa for a predetermined first period of time of at least 90 seconds; (c) releasing the first elevated pressure for a predetermined pause period of time; and (d) pressurizing the temperature sensitive material to a second elevated pressure of at least 250 MPa for a predetermined second period of time of at least 90 seconds.

In more specific embodiments, the initial temperature is from −40° C. to −20° C. (e.g., −30° C. to −40° C.), the first elevated pressure is from 250 MPa to 350 MPa (e.g., from 325 MPa to 350 MPa), the predetermined first period of time is from 90 seconds to 600 seconds (e.g., from 90 seconds to 360 seconds), the predetermined pause period of time is from 1 second to 120 seconds (e.g., from 1 second to 60 seconds), the second elevated pressure is from 250 MPa to 350 MPa (e.g., from 325 MPa to 350 MPa) and the predetermined second period of time is from 90 seconds to 360 seconds (e.g., from 90 seconds to 180 seconds). As one of skill in the art will appreciate, the predetermined first and second periods of time may be the same or different. Similarly, the first and second elevated pressures may be the same or different. During the predetermined pause period of time, the temperature sensitive material is typically subjected to ambient pressure only.

Following the foregoing pressurizing steps, the disclosed methods may further comprise refreezing the temperature sensitive materials to a final temperature of less than or equal to 0° C. (e.g., from −40° C. to −20° C.) to enable the formation of ice crystals within the temperature sensitive material. Alternatively, the disclosed methods may further comprise cooling the temperature sensitive materials to a final temperature of from 0° C. to 4.5° C. following the pressurizing steps.

Temperature sensitive materials suitable for use with the disclosed methods include food products, pharmaceutical products (e.g., temperature sensitive medications, vaccines and IV solutions) and cosmetic products.

Representative suitable food products include: frozen desserts, such as ice cream, pies and cakes; main meal entrees, such as macaroni and cheese, beef stew, pot pies, pizza, beef jerky, tuna noodle casserole, shrimp alfredo, and chicken noodle dinners; soups, such as vegetable, beef, chicken and rice, and chicken noodle; vegetable based soups; sour cream based soups, entrees and stews, such as beef stroganoff, roasted potato soup, sauerbraten, chicken alfredo, seafood chowders, lemon-dill salmon; beverages, including without limitation, chocolate milk and mocha frappaccino; creamy salad dressings, like Blue cheese and Ranch; dips, such as Ranch and French Onion; fresh, frozen, or pickled vegetables, such as potatoes, carrots, green beans, broccoli, cauliflower, cucumbers, sweet potatoes, asparagus, and peas; chowders, like clam chowder and ham chowder; raw, dried, or cooked meats, including fish, beef, lamb, pork, chicken, turkey, shellfish, oysters, and clams; meats and seafoods marinated with sauces, such as barbeque sauce, Teriyaki, and sweet and sour sauce; side dishes, such as rice bowls, and sauce and noodles; sauces, such as alfredo, cheese, hollandaise, béarnaise, sour cream, and gravies that include beef, pork, chicken, and turkey; packaged, lunch and snack meats with water activity greater than 0.85; fruit based beverages which have heat sensitive flavors (like tropical fruits), fruit based smoothies, and fruit based pie fillings; and herbs and spices.

As disclosed above, the food products may be acidified or non-acidified. For example, the food product may be an acidified food product comprising an acidulant in an amount effective to adjust the pH of the food product to 3.6 to 4.5. In more specific embodiments, the pH of the food product is from 3.9 to 4.5 or, even more specifically, from 4.1 to 4.5. These pH ranges render the food products shelf stable after high pressure processing. In addition, food products comprising such acidulants have little or no acid bite due to the unique combination of acidulants. Amounts of acidulant effective to achieve these pHs typically range from about 0.4% to about 1.2% by weight based on the total weight of the food product.

In certain embodiments of the foregoing, the acidulant may comprise: (a) at least 50% gluconic acid; and (b) 10% or less of (i) one or more additional acids selected from the group consisting of acetic, adipic, citric, sorbic, lactic, malic, ascorbic, erythorbic, tartaric, phosphoric, sulfuric and hydrochloric acids or (ii) one or more acid salts selected from the group consisting of sodium, calcium and potassium salts of phosphoric, sulfuric and hydrochloric acids. For example, in more specific embodiments, the acidulant may comprise: (a) 90% to 95% gluconic acid; and (b) 5% to 10% sodium acid sulfate or potassium acid sulfate. The blend of gluconic acid and either sodium acid sulfate or potassium acid sulfate has a salt-replacing effect as this blend unexpectedly tastes salty rather than sour.

In embodiments wherein the food product is non-acidified, the pH of the food product may be at least 4.6 and the food product may be pasteurized.

In addition, the food products may comprise one or more additives selected from the group consisting of sodium nitrite, potassium nitrite, nisin, subtilin, prune juice concentrate, lysozyme, cranberry juice concentrate, sodium benzoate, potassium sorbate, lactoferrin and sodium lactate.

It is preferred that the additional acids and additives be selected from those naturally occurring in the edible food being acidified. For example, acetic acid would be added to a barbequed meat product to provide a vinegar bite. Malic acid would be added to apples and tomatoes, as it is a naturally occurring acid in those foods. Adipic acid naturally occurs in grapes and potatoes and can be used as an additional acidulant for those foods. Similarly, citric acid occurs in lemon, grapefruit, and orange products and can be used as an additional acidulant for those foods. Another example is lactic acid, which can be added as an additional acidulant in milk-based products. These additional acids are employed to assist in the acidification without altering the taste and, in fact, in many instances enhance the taste with similar acid combinations.

The disclosed methods may be conducted within a pressure vessel chamber which is maintained at −1° C. or less to enable the formation of ice crystals (e.g., at −20° C. or less, or, more preferably, at −30° C. or less), or the vessel may be comprised of an insulated insert which fits into the pressure vessel chamber and insulates the frozen temperature sensitive product from the temperature of the vessel chamber interior wall and lessens the sidewall heat loss from the adiabatic heat rise. It is preferred to operate the entire vessel in a −30° C. environment or even lower than −30° C. In such an embodiment, the temperature sensitive material being subjected to pressurization will have an expected heat temperature rise of about 5° C. to 8° C. at 250 MPa to 350 MPa, which temperature increase is reversed upon depressurization.

The following examples are provided for purposes of illustration, not limitation.

EXAMPLES

Example 1

Barbequed beef and sauce prepared as follows:
1. Beef brisket or other cut is cut into slices and cooked. After cooking to a sterile condition, the meat is shredded and set aside.
2. A sauce is then prepared with the ingredients set forth in Table 1 below.

TABLE 1

| Sauce - Ingredients | % |
|---|---|
| Water | 7.720 |
| Tomato paste (28-30 Brix) | 34.982 |
| Sodium acid sulfate | 0.500 |
| White vinegar (4% acetic acid) | 15.000 |
| Salt | 1.000 |
| Hydrolyzed vegetable protein | 0.280 |
| Sugar | 15.000 |
| Maltodextrin (4 to 7 DE) | 20.968 |
| Citric acid | 0.100 |
| Xanthan gum | 0.080 |
| Spices | 1.350 |
| Smoke Flavoring | 1.120 |
| Sorbic acid | 0.500 |
| Yeast extract | 1.000 |
| Gluconic acid (50% concentration) | 0.8 |
| TOTAL | 100.000 |

The ingredients are combined in the weight percentages indicated in Table 1 based on the total weight of the sauce. It is noted that this sauce contains as acidulants gluconic acid, sodium acid sulfate, and citric acid.

60 grams of the sauce and 40 grams of the shredded beef are combined and then thoroughly blended. The mixture is cold filled into pouches or appropriate flexible packaging and sealed. The packages are then frozen to a temperature of −30° C., placed in a high pressure vessel chamber (which has also been cooled to −30° C.), pressurized to 330 MPa and held at that pressure for 30 seconds.

The resulting barbequed beef has a shelf life of at least 2 years. The product has a very mild and pleasing acid taste without tartness or a sharp acid bite.

Example 2

Example 1 is repeated, but the gluconic acid is omitted, and an equivalent molar amount of additional acetic acid is added to the sauce. The resulting product is shelf stable and has a distinct acid bite.

The following Examples 3-9 illustrate further implementations of the present disclosure. The percentages indicated in these examples are weight percentages of the total weight of the food.

Example 3

TABLE 2

Alfredo sauce

| Ingredients | grams | % |
|---|---|---|
| Water | 482.04 | 47.532% |
| Cream, 35% fat | 450.00 | 44.373% |
| modified corn starch | 25.50 | 2.514% |
| 15X starter distillate | 1.20 | 0.118% |
| natural butter flavor | 0.10 | 0.010% |
| Sugar | 10.00 | 0.986% |
| Onion powder | 2.00 | 0.197% |
| White pepper | 0.50 | 0.049% |
| Garlic powder | 2.00 | 0.197% |
| Xanthan gum | 0.50 | 0.049% |
| Propylene glycol alginate | 0.40 | 0.039% |
| Carrageenan | 0.30 | 0.030% |
| Maltodextrin, 5 DE | 20.00 | 1.972% |
| Yeast extract. | 3.00 | 0.296% |
| Rosemary extract | 0.20 | 0.020% |
| Sodium acid sulfate | 0.40 | 0.039% |
| Gluconic acid (50% conc.) | 16.00 | 1.578% |
| TOTAL | 1014.14 | 100.000% |

The water and starch are mixed to a slurry, and the dry ingredients are mixed with xanthan gum as indicated at a pH of 4.5. Cream is added thereto, after which the acids are slowly added. The resultant mixture is cold filled into a flexible package and sealed. The package is then frozen to a temperature of −30° C., placed in a high pressure vessel chamber (which has been also cooled to −30° C.), pressurized to 330 MPa and held at that pressure for 30 seconds.

This same Alfredo sauce with no acids added and a natural pH of 6.8 can be pasteurized by high pressure at 330 MPa at −30° C. for 3.5 minutes.

Example 4

TABLE 3

Acidified Vegetables

| | Green beans | | Carrots | | Potatoes | |
|---|---|---|---|---|---|---|
| | % | grams | grams | % | grams | % |
| Green beans | 32.67% | 163.35 | | | | |
| Carrots | | | 163.35 | 32.67% | | |
| diced potatoes, ½ inch cubes | | | | | 730.00 | 41.97% |

TABLE 3-continued

| | Acidified Vegetables | | | | | |
|---|---|---|---|---|---|---|
| | Green beans | | Carrots | | Potatoes | |
| | % | grams | grams | % | grams | % |
| Water | 65.00% | 325.00 | 325.00 | 65.00% | 975.00 | 56.06% |
| gluconic acid (50% conc.) | 0.65% | 3.25 | 3.25 | 0.65% | 9.75 | 0.56% |
| Sodium acid sulfate | 0.08% | 0.40 | 0.40 | 0.08% | 1.20 | 0.07% |
| Sugar | 1.00% | 5.00 | 5.00 | 1.00% | 5.00 | 0.29% |
| Maltodextrin, 5 DE | | | | | 10.00 | 0.57% |
| yeast extract | 0.25% | 1.25 | 1.25 | 0.25% | 4.00 | 0.23% |
| Salt | 0.25% | 1.25 | 1.25 | 0.25% | 3.75 | 0.22% |
| Inosinate/Guanylate | 0.10% | 0.50 | 0.50 | 0.10% | 0.50 | 0.03% |
| TOTAL | 100.00% | 500.00 | 500.00 | 100.00% | 1739.20 | 100.00% |
| pH: 3.9 | | | | | | |

Example 5

TABLE 4

| Macaroni & Cheese | % | overall batch size (grams) | component batch size (grams) |
|---|---|---|---|
| cooked macaroni | 61.40% | 1000.00 | 614.000 |
| cheese sauce | 38.60% | | 386.000 |

| order of addition | Cheese sauce | grams | % | batch size (grams) | overall % |
|---|---|---|---|---|---|
| 1 | cream (40% butter fat) | 915.00 | 43.429% | 167.637 | 16.837% |
| 2 | Unsalted butter | 113.44 | 5.384% | 20.783 | 2.088% |
| 3 | water | 710.65 | 33.730% | 130.198 | 13.075% |
| 4 | 15X starter distillate | 1.70 | 0.081% | 0.311 | 0.031% |
| 5 | natural butter flavor | 0.10 | 0.005% | 0.018 | 0.002% |
| | Dry blend together: | | | | |
| 6 | Maltodextrin, 5 DE | 150.00 | 7.120% | 27.482 | 2.760% |
| 7 | cheddar cheese powder | 130.00 | 6.170% | 23.817 | 2.392% |
| 8 | yeast extract | 3.40 | 0.161% | 0.623 | 0.063% |
| 9 | Yeast extract | 15.67 | 0.744% | 2.871 | 0.289% |
| | modified corn starch | 9.38 | 0.445% | 1.719 | 0.173% |
| 10 | Locust bean gum | 1.25 | 0.059% | 0.229 | 0.023% |
| 11 | Propylene glycol alginate | 3.00 | 0.142% | 0.550 | 0.055% |
| 12 | Xanthan gum | 1.85 | 0.088% | 0.339 | 0.034% |
| 13 | Carrageenan | 1.50 | 0.071% | 0.275 | 0.028% |
| 14 | natural cheddar cheese flavor | 2.15 | 0.102% | 0.394 | 0.040% |
| 15 | Potassium chloride | 3.00 | 0.142% | 0.550 | 0.055% |
| 16 | Salt | 16.00 | 0.759% | 2.931 | 0.294% |
| | Dry blend together: | | | 0.000 | |
| 17 | Sodium acid sulfate | 9.08 | 0.431% | 1.664 | 0.167% |
| 18 | Sorbic acid | 1.50 | 0.071% | 0.275 | 0.028% |
| 19 | Gluconic acid (50% conc.) | 18.20 | 0.864% | 3.334 | 0.167% |
| | TOTAL | 2106.87 | 100% | 386.000 | |

Example 6

TABLE 5

| Macaroni process | | | |
|---|---|---|---|
| Process: | | | |
| Macaroni Preparation: | | equilibrated pH: 3.80 | |
| 37.74% dry macaroni + 62.26% water + cooking = cooked macaroni | | | Batch size (grams) 614.0 |
| 1. Acidified cooking water composition: | | | |
| a. Gluconic acid (50% conc.) | | 1.80% | 6.88 | 0.344% |
| b. Sodium acid sulfate | | 0.10% | 0.38 | 0.038% |

TABLE 5-continued

|   | | grams | % |
|---|---|---|---|
| c. | starter distillate | 0.10% | 0.38 | 0.038% |
| d. | sorbic acid | 0.05% | 0.19 | 0.019% |
| e. | water | 97.95% | 374.44 | 37.790% |
| f. | Added 15 grams butter to the macaroni while cooking up to prevent sticking | | | |
|   | | 792 | 100.00% | |
|   | | 480 | | |
|   | | 1272 | | |
| 2. | macaroni batch formula: | | % | |
|   | Dry macaroni | 37.74% | 231.72 | 23.170% |
|   | acidified water | 62.26% | | |
|   | | | 614.00 | |
| 3. | Process: | | | 100.00% |

Weigh dry blend together 1a, 1b, 1c and 1d.
Preweigh water (1e) into a swept agitation mixer with a heat jacket.
Add the dry blend to the water and heat to boiling.
Add the macaroni and simmer for 8 minutes.

Cheese sauce preparation:

1. To a swept surface, agitation, heat jacketed kettle, weigh and add the wet ingredients (1-5) with agitation.
2. In a dry blender, weigh the dry ingredients (6-16) and blend until uniform.
3. In a second dry blender, weigh and blend the acid powders (17-19).
4. To the wet ingredients, with agitation (better with a lightening mixer in addition to the mixer kettle agitators) add the dry ingredients from # 2 and blend until uniform.
5. Slowly add the dry acids (from step # 3) and continue blending.
6. To the sauce, add the cooked and cooled macaroni, fill into flexible packaging and freeze to −30° C.
7. Place packaged macaroni & cheese into a pre-chilled high pressure vessel (−30° C.) and
8. Pressurize to 330 MPa and hold at 330 MPa for 30 seconds.

Example 7

TABLE 6

Acidified Mashed Potatoes

|  | Version A | | Version B | |
|---|---|---|---|---|
|  | grams | % | grams | % |
| cooked, fresh potatoes | 76.10 | 74.89% | 760.00 | 74.84% |
| Salt | 0.70 | 0.69% | 7.00 | 0.69% |
| butter, no salt | 6.20 | 6.10% | 62.00 | 6.11% |
| milk, whole | 17.00 | 16.73% | 168.50 | 16.59% |
| Gluconic acid (50% conc.) | 1.50 | 1.48% | 17.00 | 1.67% |
| Sodium acid sulfate | 0.12 | 0.12% | 1.00 | 0.10% |
|  | 101.62 | 100.00% | 1015.50 | 100.00% |
|  | pH: 4.05 | | pH: 4.10 | |

Procedures:

1. Peel fresh potatoes and cut into 1 inch dices; place in boiling, 0.7% salted water and cook for 20 minutes (until tender), drain.
2. Add cooked potatoes to a mixer.
3. Weigh and add to the potatoes, the salt, milk, unsalted butter, gluconic acid and Sodium acid sulfate.
4. Whip until smooth. Fill into flexible packaging and freeze to −30° C.

TABLE 6-continued

5. Place mashed potatoes into a pre-chilled high pressure vessel (−30° C.) and pressurize to 330 MPa and hold at 330 MPa for 30 seconds.

Example 8

TABLE 7

Mocha Frappuccino ®

|  | A | | B | |
|---|---|---|---|---|
|  | grams | % | grams | % |
| Milk | 113.40 | 24.405% | 907.20 | 46.109% |
| chocolate syrup | 23.20 | 4.993% | 170.10 | 8.645% |
| Sugar | 20.26 | 4.360% | 170.10 | 8.645% |
| Water | 74.40 | 16.012% | 680.40 | 34.582% |
| ice (water) | 226.80 | 48.810% | 0.00 | 0.000% |
| instant coffee | 1.20 | 0.258% | 7.20 | 0.366% |
| gluconic acid (50% conc.) | 5.00 | 1.076% | 30.00 | 1.525% |
| Sodium acid sulfate | 0.40 | 0.086% | 2.50 | 0.127% |
|  | 464.66 | 100.000% | 1967.50 | 100.000% |

Example 9

TABLE 8

Ground beef

Samples: Inoculated raw ground beef
Pressure: 250 & 300 psi
Time: As defined below
Temperature:

1. Product: frozen (see below)
2. Vessel chamber water: 4° C.

TABLE 8-continued

Ground beef

Inoculation level (CFU/g):

E. coli O157:H7 (5 strains): $1.1 \times 10^4$;
Salmonella (4 strains): $2.1 \times 10^4$;
L. monocytogenes (5 strains): $1.0 \times 10^4$

| Days After HPP | Lab ID # | Temp (° C.) | Pressure Mpa | Time (second) | E. coli CFU/g | Lab ID # | Salmonella CFU/g | Lab ID # | L. monocytogenes CFU/g |
|---|---|---|---|---|---|---|---|---|---|
| | 1 | −20 | | Control | 7,000 | 37 control | 18,000 | 73 control | 9,000 |
| | 2 | −20 | 250 | 30 | 5,000 | 38 | 14,000 | 74 | 6,800 |
| | 3 | −20 | 250 | 60 | 4,100 | 39 | 13,000 | 75 | 6,300 |
| | 4 | −20 | 250 | 180 | 800 | 40 | 1,000 | 76 | 570 |
| | 5 | −20 | 250 | 30/30 | 1,600 | 41 | 15,000 | 77 | 6,200 |
| | 6 | −20 | 250 | 60/60 | 900 | 42 | 3,300 | 78 | 1,300 |
| | 7 | −20 | 250 | 180/180 | <10 | 43 | <10 | 79 | 10 |
| | 8 | −20 | 250 | 60/30 | 1,000 | 44 | 3,000 | 80 | 600 |
| | 9 | −20 | 250 | 180/30 | 90 | 45 | 20 | 81 | 90 |
| | 10 | | | Not Applicable | | 55 | Not Applicable | 91 | Not applicable |
| | 11 | −20 | 300 | 30 | 4,500 | 56 | 13,200 | 92 | 6,100 |
| | 12 | −20 | 300 | 60 | 3,600 | 57 | 11,000 | 93 | 5,700 |
| | 13 | −20 | 300 | 180 | 700 | 58 | 900 | 94 | 450 |
| | 14 | −20 | 300 | 30/30 | 1,600 | 59 | 11,000 | 95 | 5,100 |
| | 15 | −20 | 300 | 60/60 | 900 | 60 | 1,200 | 96 | 1,200 |
| | 16 | −20 | 300 | 180/180 | <10 | 61 | <10 | 97 | <10 |
| | 17 | −20 | 300 | 60/30 | 1,100 | 62 | 2,500 | 98 | 1,500 |
| | 18 | −20 | 300 | 180/30 | 90 | 63 | 30 | 99 | 30 |
| | 19 | −30 | | Control | 7,000 | 46 control | 17000 | 82 control | 8,000 |
| | 20 | −30 | 250 | 30 | 4,700 | 47 | 14,000 | 83 | 6,900 |
| | 21 | −30 | 250 | 60 | 4,100 | 48 | 13,000 | 84 | 5,800 |
| | 22 | −30 | 250 | 180 | 340 | 49 | 490 | 85 | 630 |
| | 23 | −30 | 250 | 30/30 | 1,600 | 50 | 15,000 | 86 | 5,600 |
| | 24 | −30 | 250 | 60/60 | 900 | 51 | 3,300 | 87 | 1,100 |
| | 25 | −30 | 250 | 180/180 | <10 | 52 | <10 | 88 | <10 |
| | 26 | −30 | 250 | 60/30 | 1,000 | 53 | 3,000 | 89 | 500 |
| | 27 | −30 | 250 | 180/30 | 90 | 54 | 20 | 90 | 80 |
| | 28 | | | Not Applicable | | 64 | Not Applicable | 100 | Not applicable |
| | 29 | −30 | 300 | 30 | 4,800 | 65 | 10,000 | 101 | 5,600 |
| | 30 | −30 | 300 | 60 | 3,200 | 66 | 6,400 | 102 | 5,900 |
| | 31 | −30 | 300 | 180 | 230 | 67 | 120 | 103 | 220 |
| | 32 | −30 | 300 | 30/30 | 1,200 | 68 | 10,000 | 104 | 4,700 |
| | 33 | −30 | 300 | 60/60 | 950 | 69 | 1,600 | 105 | 900 |
| | 34 | −30 | 300 | 180/180 | <10 | 70 | <10 | 106 | <10 |
| | 35 | −30 | 300 | 60/30 | 1,300 | 71 | 1,900 | 107 | 1,100 |
| | 36 | −30 | 300 | 180/30 | 20 | 72 | 10 | 108 | <10 |

In example 9, raw hamburger (15% fat) from a local supermarket was divided into three portions with each portion inoculated with a group of pathogenic microbes. The first portion was inoculated with 5 strains of Listeria monocytogenes (ATCC 7644, ATCC 11914, ATCC 11915, Scott A and V-7 at $1.0 \times 10^4$ cfu/gram with detection procedures as outlined according to FSIS. The second portion was inoculated with strains of Salmonella (including NFPA 1 S. senftenberg, NFPA 2 S. typhimurium, NFF S. enteritidis) at $2.1 \times 10^4$ cfu/gram with detection procedures outlined in the FDA Bacteriological Analytical Methods manual. The third portion was inoculated with 4 strains of Escherica coli 0157:H7 (FDA 1 Seattle 13A24, FDA 2 Seattle 13A46, FDA Seattle 3 13A29 and FDA Seattle 6318JIB) at $1.0 \times 10^4$ cfu/gram with detection procedures outlined in the FDA Bacteriological Analytical Methods manual. Each of meat was separated into 25 gram samples and vacuum packed in cryovac plastic pouches and sealed. Two pouches from each microbiological portion were set aside as untreated controls for initial inoculation counts and two pouches were assigned to each test treatment. The test treatments were as follows:

Temperatures: −20° C. and −30° C.

Pressures: 250 MPa (36,257 psi) and 300 MPa (43,511 psi)

Times (seconds): 30, 60, 180 and pulsing times: 30/30, 60/60, 180/180, 60/30 and 180/30.

The microbiological results are reported in Table 8 above. At −20° C. & −30° C. and 250 MPa & 300 MPa and 180/180 seconds (pulsing), all microbes were inactivated including those naturally occurring in the meat. When comparing single pulses and two pulses, there was no difference in lethality. There was also no difference in the lethality between −20° C. & −30° C. The microbial population was almost completely inactivated at both temperatures and pressures after a time of 180/30 seconds (pulsing). It is conceivable that complete inactivation can be achieved after 4 minutes at 250 MPa and 300 MPa and 330 MPa and at −20° C. & −30° C. Test results at 330 MPa and product temperatures of −30° C., −10° C., and 0° C., with strains of Salmonella (including NFPA 1 S. senftenberg, NFPA 2 S. typhimurium, NFF S. enteritidis) at $3.1 \times 10^4$ cfu/gram, are set forth below:

Pressure: 330 mpa
Time: 3, 4, 5, 6 minutes
Temperature:
1. Product: −30° C., −10° C., 0° C.
2. Water: 8° F.
3. Vessel Temp: 8° F.

| Days After HPP | Micro Lab ID # | Product | Pressure (Mpa) | Time (min) | *Salmonella* CFU/g |
|---|---|---|---|---|---|
| | | Inoculation Level: 3.1 × 10⁴ CFU/g | | | |
| | | minus 30° C. | | | |
| 10 | 9033 | Ground Beef (Control No HPP) | 0 | 0 | 2,000 |
| 10 | 9034 | Ground Beef (HPP) | 330 | 3 | <10 |
| 10 | 9035 | Ground Beef (HPP) | 330 | 4 | <10 |
| 10 | 9036 | Ground Beef (HPP) | 330 | 5 | <10 |
| 10 | 9037 | Ground Beef (HPP) | 330 | 6 | <10 |
| | | Minus 10° C. | | | |
| 10 | 9038 | Ground Beef (Control No HPP) | 0 | 0 | 1,400 |
| 10 | 9039 | Ground Beef (HPP) | 330 | 3 | <10 |
| 10 | 9040 | Ground Beef (HPP) | 330 | 4 | <10 |
| 10 | 9041 | Ground Beef (HPP) | 330 | 5 | <10 |
| 10 | 9042 | Ground Beef (HPP) | 330 | 6 | <10 |
| | | 0° C. | | | |
| 10 | 9043 | Ground Beef (Control No HPP) | 0 | 0 | 7,000 |
| 10 | 9044 | Ground Beef (HPP) | 330 | 3 | <10 |
| 10 | 9045 | Ground Beef (HPP) | 330 | 4 | <10 |
| 10 | 9046 | Ground Beef (HPP) | 330 | 5 | <10 |
| 10 | 9047 | Ground Beef (HPP) | 330 | 6 | <10 |

Example 10

As an alternative to Examples 1, 2 and 9, meat may be marinated to lower pH to between 6.8 to 5.6, sealed into packages, frozen to less than −20° C., and subjected to pressure pulses above 250 MPa, with pressure application time dependent upon the type of meat, the temperature, and pressure.

Example 11

Pickles are soaked in 0.1% calcium chloride or calcium gluconate for approximately 30 minutes after which the pickles may be appropriately sealed in packages. The packaged pickles are then frozen to less than −20° C., and subjected to pressure pulses greater than 250 MPa, with the time of pressure application dependent upon the temperature and pressure.

Example 12

Pharmaceuticals (including but not limited to temperature sensitive medications, vaccines and IV solutions) may be sealed in an appropriate package, frozen to less than −20° C., and subjected to pressure pulses greater than 250 MPa.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method for sterilizing a food product, the method comprising:
   (a) vacuum packing and sealing the food product in a flexible package to provide a sealed food product;
   (b) thereafter, freezing the sealed food product to an initial temperature of less than or equal to −2° C. to provide a sealed frozen food product in which ice crystals are formed;
   (c) thereafter, placing the sealed frozen food product in a pressure vessel chamber containing water; and
   (d) pressurizing the sealed frozen food product in the pressure vessel chamber to a first elevated pressure of at least 250 MPa for a predetermined first period of time for at least 3 minutes, wherein the pressure vessel chamber containing water is maintained at a temperature of −1° C. or lower during pressurizing.

2. The method of claim 1 further comprising, after the pressurizing, releasing the pressure and cooling the sealed frozen food product when releasing the pressure.

3. The method of claim 1 wherein the food product is an acidified food product comprising an acidulant in an amount effective to adjust the pH of the food product to 3.6 to 4.5.

4. The method of claim 3 wherein the pH of the food product is from 3.9 to 4.5.

5. The method of claim 1 wherein the pH of the food product is from 4.1 to 4.5.

6. The method of claim 3 wherein the acidulant comprises:
   (a) at least 50% gluconic acid; and
   (b) 10% or less of (i) one or more additional acids selected from the group consisting of acetic, adipic, citric, sorbic, lactic, malic, ascorbic, erythorbic, tartaric, phosphoric, sulfuric and hydrochloric acids or (ii) one or more acid salts selected from the group consisting of sodium, calcium and potassium salts of phosphoric, sulfuric and hydrochloric acids.

7. The method of claim 6 wherein the acidulant comprises:
   (a) 90% to 95% gluconic acid; and
   (b) 5% to 10% sodium acid sulfate or potassium acid sulfate.

8. The method of claim 2 wherein the food product comprises one or more additives selected from the group consisting of sodium nitrite, potassium nitrite, nisin, subtilin, prune juice concentrate, lysozyme, cranberry juice concentrate, sodium benzoate, potassium sorbate, lactoferrin and sodium lactate.

9. The method of claim 1 wherein the initial temperature is from −40° C. to −20° C.

10. The method of claim 9 wherein the initial temperature is from −30° C. to −40° C.

11. The method of claim 1 wherein the first elevated pressure is from 250 MPa to 350 MPa.

12. The method claim 11 wherein the first elevated pressure is from 325 MPa to 350 MPa.

13. The method of claim 1 wherein the predetermined first period of time is from 3 minutes to 10 minutes.

14. The method of claim 13 wherein the predetermined first period of time is from 3 minutes to 6 minutes.

15. The method of claim 1 wherein the method further comprises cooling the food product to a final temperature of from 0° C. to 4.5° C. following the pressurizing step.

16. The method of claim 1 further comprising refreezing the sealed food product to a final temperature of less than or equal to 0° C. following the pressurizing step.

17. The method of claim 16 wherein the final temperature is from −40° C. to −20° C.

18. The method of claim 1 wherein the food product is raw meat.

19. A method for sterilizing a food product, the method comprising:
   (a) placing a sealed package of a frozen food product in a pressure vessel chamber containing water, wherein the sealed package of the frozen food product includes ice crystals and is vacuum packed; and
   (b) thereafter, applying at least 250 MPa pressure to the pressure vessel chamber for at least 3 minutes, wherein the pressure vessel chamber containing water is maintained at a temperature of −1° C. or lower during pressurizing.

20. The method of claim 19 wherein the food product is raw meat.

* * * * *